(12) United States Patent
Nafziger

(10) Patent No.: US 12,214,965 B1
(45) Date of Patent: Feb. 4, 2025

(54) DIGITALLY ADJUSTABLE AND REVERSIBLE VIBRATING CONVEYOR

(71) Applicant: McMennamy-Nafziger & Associates, Marietta, GA (US)

(72) Inventor: Steven S. Nafziger, Lawrenceville, GA (US)

(73) Assignee: McMennamy-Nafziger & Accessories, Marietta, GA (US)

( * ) Notice: Subject to any disclaimer, the term of this patent is extended or adjusted under 35 U.S.C. 154(b) by 0 days.

(21) Appl. No.: 18/222,250

(22) Filed: Jul. 14, 2023

(51) Int. Cl.
B65G 27/32 (2006.01)

(52) U.S. Cl.
CPC .................................... B65G 27/32 (2013.01)

(58) Field of Classification Search
None
See application file for complete search history.

(56) References Cited

U.S. PATENT DOCUMENTS

| | | | | |
|---|---|---|---|---|
| 4,813,532 A * | 3/1989 | Harper | ................... | B65G 27/32 198/767 |
| 7,216,757 B1 * | 5/2007 | Patterson | ............... | B65G 27/30 198/764 |
| 10,974,907 B2 * | 4/2021 | Olmstead | ............... | B65G 27/12 |
| 11,577,918 B2 * | 2/2023 | Hicks | ..................... | B65G 43/00 |
| 2023/0115607 A1 * | 4/2023 | Smith | ..................... | B65G 27/24 198/446 |

* cited by examiner

Primary Examiner — Kavel Singh
(74) Attorney, Agent, or Firm — Denton Intellectual Property Law Firm, LLC; F. Russell Denton

(57) ABSTRACT

The invention is a digitally adjustable and reversible vibrating conveyor. It provides a trough to which sinusoidal motion is applied variably and adaptably. A motor turns a shaft in an oscillating or rocking motion about its longitudinal axis. Variable settings on a controller determine the oscillation parameters for the motor. These settings particularly address three variables: the oscillation speed; the arc angle through which the oscillation proceeds, and a net angle that represents the mid-point for the oscillation relative to vertical. The invention allows for adaptation of vibrating conveyors without adjusting them mechanically, and enables reversal of load transfer direction when desired.

20 Claims, 4 Drawing Sheets

DIGITALLY ADJUSTABLE AND REVERSIBLE VIBRATING CONVEYOR

STATEMENT REGARDING FEDERALLY SPONSORED RESEARCH OR DEVELOPMENT

No federal funds were used for discovery or development of the invention herein.

BACKGROUND OF THE INVENTION

Field of the Invention

Vibrating conveyors for transfer of parts, pieces, and bulk for production and processing.

Description of Related Art

Vibrating conveyors employ a solid pathway that is turned up at the sides to form a trough. Such troughs are commonly flat and shallow, but they can also be used to drive deep beds of load pieces. The unit loads may be any shape, including chips, powders and irregularly shaped materials. Vibrating conveyors are common when transferring dry food-grade solids where sanitation and low maintenance are essential. Also, these conveyors are also suited for difficult process environments, including those that are dirty, chemically corrosive, or hot (e.g., 820° C. for just-cast metal parts). And their stationary design permits use for sorting, screening, classifying and orienting parts.

Vibrating conveyors tend to be classified according to their use. All of them cause sinusoidal motions, typically lengthwise so that unit loads "hop" toward their common destination, and commonly operate at many cycles per seconds. But it is useful to classify them according to their drive mechanisms. Crank (also called spring-type) conveyors use a motor to impart an elastic force. Rotating weight and electromagnetic conveyors use rotating eccentric weights and rotating magnetic fields, respectively. Each of these is widely used. One full stroke (cycle) of trough movement tends to be twice the amplitude of the vibration, but most vibrating conveyor designs aim to minimize the amplitude while maximizing the frequency. Both parameters can be controlled and optimized to customize the operation for a specific grade of unit load.

In addition, many conveyors for small objects employ a trough at a set downward angle, leveraging gravity-feed forces; these sloped designs typically use an angle in the range of 5° to 45° relative to horizontal.

The conveyors may also be of any duty grade. Standard duty grades handle light- to medium-density materials and may be either portable or installed. Their capacities may reach 40 tons per hour at speeds up to 60 feet per minute. And due to minimal mechanical wear, their lifecycles are long. Heavy-duty grades require high power to move dense materials such as rock, metal, and large, heavy unit loads, with capacities that surpass 500 tons per hour at speeds as high as 90 feet per minute. However, they tend to be fixed in place permanently and require features such as dampers or dashpots. Vibratory feeders are like the standard and heavy-duty grades, but convey materials either to another device or for instance in a bowl arrangement for directing small parts.

A major disadvantage of vibrating conveyors is their inflexibility as to transfer rates and product masses. Any change to these for a particular conveyor requires a mechanical adjustment, yet relatively few of those machines are designed to accommodate batch-to-batch adjustments for significantly different load unit masses or transfer rates. And relatively few are designed for reversing the direction of transfer. Yet adaptability would be advantageous in conveyors for every industry from pills to parts to potatoes. Consequently, there is an ongoing need for vibrating conveyors that have improved designs.

BRIEF SUMMARY OF THE INVENTION

The invention provides a digitally adjustable and reversible vibrating conveyor. In particular it provides a trough to which sinusoidal motion is applied variably and adaptably. A motor turns a shaft in an oscillating or rocking motion about its longitudinal axis. Variable settings on a controller determine the oscillation parameters for the motor. These settings particularly address three variables: the oscillation speed; the arc angle through which the oscillation proceeds, and a net angle that represents the mid-point for the oscillation relative to vertical. The invention allows for adaptation of vibrating conveyors without adjusting them mechanically, and enables reversal of load transfer direction when desired.

Specifically, the invention provides a digitally adjustable and reversible vibrating conveyor comprising:
 a) a shaft having a longitudinal axis;
 b) a motor that is mechanically connected to the shaft, and which turns the shaft about its longitudinal axis in an oscillating motion;
 c) a controller that is in electrical communication with the motor, wherein the controller is capable of receiving input data from a user and conveying values for each of:
  i) an oscillation speed for a shaft about its longitudinal axis between a first oscillation position and a second oscillation position, wherein oscillating from the first position to the second position and then back to the first position defines an oscillation cycle;
  ii) an arc angle representing a difference between the first and second oscillation positions, wherein:
   A) bisection of the arc angle defines an oscillation midpoint position; and
   B) a midpoint plane is defined proceeding radially from the longitudinal axes of the shaft through a surface of the shaft along that bisection;
  iii) a net angle representing a difference between a vertical line and the midpoint plane; and
 d) a trough that is in mechanical communication with the shaft, such that:
  i) the oscillation speed of the shaft conveys cyclically alternating upward and downward force on the trough in proportion to that speed;
  ii) each oscillation through the arc angle conveys lateral force along the trough for a period that is proportional to that angle, wherein:
   A) in combination with the oscillation speed the arc angle determines an oscillation's characteristic frequency; and
   B) in combination with the oscillation speed the arc angle also determines amplitude for the force applied in each half of an oscillation cycle;
  iii) whether the net angle is positive or negative determines whether items placed on the conveyor proceed in a net forward direction or net backward direction along the trough or remain in place there; and
  iv) the oscillation speed, arc angle and net angle together determine transfer rates at which items of a particular size and mass that are placed on the conveyor can proceed along the trough.

DETAILED DESCRIPTION OF THE INVENTION

Figure 1A:
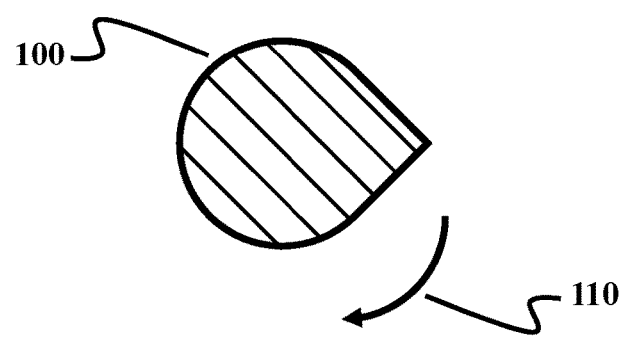
FIG. 1A is a caricature of a transverse tear-drop shaped cross-section of a shaft at its counterclockwise extreme of rotation.

The invention may be better understood by reference to the following definitions.

The term "vibrating conveyor" means an apparatus for conveying material objects along a mechanical track, in which shaking motions applied by the conveyor provide energy to propel those objects. The shaking may be by vibrations or may be by motion over a longer period of time of longer range of distance than vibrations typically are.

The term "digitally adjustable" means that entry of one or more values, settings, or commands to a computational device is sufficient to implement the adjustment.

The term "reversible" as used with respect to a vibrating conveyor means that its direction of transfer can be reversed.

The term "shaft" has its usual and ordinary meaning in engineering and machine design. A shaft may be a rod, may be shaped for a fitting on one or both ends, and may have slots or protrusions running for a substantial portion of its length. The term "longitudinal axis" as used with respect to a shaft refers to a rotational axis that runs through its length. The term "turn(s)" as used in that context means rotating the shaft about its longitudinal axis.

The terms "motor", "servo motor" and "stepper motor" have their usual and ordinary meanings in the engineering arts. As used herein, the term motor is not limited by its power source. It may be an electrical motor powered by current from a transmission line, battery, supercapacitor, fuel cell or solar cell. It may be a combustion motor, such as one that burns gasoline, diesel, biodiesel, methane, ethane, propane, butane or hydrogen. It may be a pressure-powered motor, for which the pressure source is a flow of air, water, steam or another fluid. Or it may be a motor powered by another source of energy.

The term "controller" as used with respect to a vibrating conveyor means an electrical device for controlling the types and range of movement provided by a motor that powers the conveyor. The term "in electrical communication" as used with reference to the controller and the motor means that the conveyor is connected to the motor such as through a cable, cord, plate or other conduit through which electrical current may pass, and through which electrical signals may be sent from the controller to the motor. In some embodiments, the electrical communication may provide signals from the motor to the controller as well.

The term "user" means a person or automated system that provides data and or setting values to the controller. The term "input data" means data entered into the controller by a user or automated system. The term "capable of receiving input data" means that the controller has circuitry configured to receive and apply data from an external source. The circuitry may be any one or combination of wired, optical, circuit board or semiconductor chip. The term "input value" means a value that is numeric, alphabetical, symbolic, or any combination of those. The term "capable of conveying values" means able to send one or more values to the motor, where the values act as commands, operating specifications, or other operating information and are either identical to the input values or are derived from them by one or more digital operations performed by the controller circuitry.

The term "mechanically connected" as used with respect to connecting a motor to a shaft means that the motor has a mechanical fitting for holding the shaft. This is analogous to a chuck for receiving a drill bit base in a hand-held electric drill but the invention is not so limited. Also note that an electric drill does not generally oscillate or rock the bit about its longitudinal axis, but instead rotates the bit in one direction continuously unless and until the spin direction is reversed such as to remove the bit once hole formation is completed.

The term "oscillating motion" means oscillation cycles between two oscillation positions. In particularly preferred embodiments, the oscillation has a frequency of at least several oscillations per second but the invention is not so limited. Rotational oscillations of shanks correspond to frequent periodic spin reversals. An "oscillation cycle" for devices according to the invention is procession from a first oscillation position and back again. Oscillation cycles may optionally include one or more pauses in the motion, for instance at either or both of the extreme positions for the oscillation, or at some intermediate position. In certain preferred embodiments there is no pause; while in others one or more such pauses are present.

The terms "first oscillation position" and "second oscillation position" refer to two different positions in an oscillation cycle. In certain preferred embodiments they refer to the extremes or boundaries of oscillation at each of which the oscillation direction is reversed; there the angle between their locations is called their "difference" and defines the furthest bounds of the oscillation on either side.

The term "oscillation speed" means the speed at which an item may be oscillated about an axis, and may be expressed in terms of oscillation cycles per minute (ocpm). The term may be used for the speed of oscillation for a shaft turned about its longitudinal axis by a motor in an embodiment of the invention.

The term "arc angle" as used with respect to oscillation means the full angle through which an oscillated item is turned before reversing. The midpoint of the turn is the "oscillation midpoint position". "Bisection" means dividing the arc angle in half. The longitudinal axis of the turned items lies on the "midpoint plane", which bisects and passes through the shaft or other turned item. The midpoint plane "proceeds radially" from either side of the longitudinal axis to the exterior of the shaft or other turned item.

The term "net angle" as used with respect to oscillation means the angle between vertical and the bisect just cited. The term "vertical" has its usual and ordinary meaning in geometry and mechanical engineering. As between a vertical line and a plane through which the vertical line passes at one point, the net angle represents the smallest angle that can be drawn between the vertical line and that plane. The net angle may be positive or negative, depending on which side of the plane the angle is measured from.

The terms "net forward direction" and "net backward direction" refer to the ultimate direction in which unit loads are conveyed when the magnitude of both forward movements and backward movements are considered and averaged for an oscillation cycle. The net direction may be zero if forward and backward transfers cancel each other. The direction of net movement may be associated with either positive or negative net angle, depending on the mechanical configuration and data inputs.

The term "in combination" as used with respect to any two or all three of oscillation speed, oscillation arc angle, and net angle refers to their collective effect on transfer parameters such as for direction, rate and force in vibrating conveyors according to the invention. The term "determine transfer rates" as used with respect to determination by one or more of the three parameters oscillation speed, arc angle and or net angle, refers to the mechanism by which and extent to which the respective parameter(s) provide transfer speeds for unit loads on a trough according to the invention.

The term "amplitude" as used with respect to force applied in a half of an oscillation cycle has its usual and ordinary meaning in engineering. In particular it is measured at the moment having the maximum force applied during that respective half-cycle.

The term "transverse cross section" as used with respect to a shaft refers to its cross section if the shaft is cut along a plane perpendicular to its longitudinal axis. The term "transverse cross-sectional shape" refers to the shape of the outer perimeter of that cross section.

The terms "round", "oval", "tear-drop-shaped", "square", "three-sided", "five-sided", "six-sided", "seven-sided", and "eight-sided" have their usual and ordinary meanings for geometrical shapes. The term "polygonal shape having more than eight sides" means a polygon having nine or more sides. Where a polygon is indicated the sides may be all the same length, or optionally not all sides may be the same length.

The term "gear-shaped" as used with respect to the transverse cross-section of a shaft means that its shape is comparable to that of a multi-pointed star, gear, or sprocket. The gear shape may have sawtooth edges, rectangular teeth, sinusoidal teeth, or other tooth shapes.

The term "trough" has its usual and ordinary meaning in vibrating conveyor design, and in particular means a pathway provided for transfer of unit loads. In devices according to the invention a shaft may be used to convey upward force or downward force on the trough in proportion to rotational speed of the shaft. Because rotational motions are not strictly vertical, they may convey force in a horizontal direction as well, but the overall affect will depend on the net angle.

The term "pendant" as used with respect to a trough on a shaft means that the trough is suspended from the shaft by mechanical means. The trough might be, for example, suspended from the shaft by a cable, rod, plate or other mechanical component that is mechanically connected to the trough at one point of the mechanical means and to the shaft at another point of the mechanical means. In a particular embodiment the trough hangs from and is directly mechanically connected to the shaft, such as with the aid of one or more bolts, screws or pins that bind them together. In certain embodiments of such suspension, the trough is held out to one side of the shaft; in a non-limiting illustrative example, one or more mechanical arms extend laterally outward from the shaft and support the weight of the trough.

The term "below and physically supporting" as used with respect to a shaft under a trough means that the trough is undergirded by the shaft, whereby the shaft bears a significant part of all of the weight of the trough. "Below" there may mean the shaft is entirely below the trough, but also contemplates for instance that the top portion of the shaft is below the top portion of the trough, such as where the bottom of a trough is saddle-shaped and has a longitudinal groove in the middle that rests upon the shaft. In a non-limiting illustrative example, a bottom surface of the trough rests directly upon a top surface of the shaft. In a further such example, an armature for holding the trough is mechanically attached on its underside to one or more portions of the shaft. In particular examples the shaft bears at least 10%, 20%, 30%, 40%, 50%, 60%, 70%, 80%, 90%, 95%, 98%, 99%, or 100% of the weight of the trough. In certain examples the shaft bears a majority percentage selected from between over 50% up to 100% of the weight of the trough. In various other examples the shaft bears a minority percentage selected from between less than 50% down to 10% of the weight of the trough. Weight-supporting features to augment support by the shaft are useful for heavy unit loads such as large rocks and ore, in order to minimize wear on the shaft during oscillation. By contrast, for light unit loads such as powders the oscillation effects of the shaft can be maximized if the shaft bears most or all of the load.

The term "in mechanical communication with," when used with reference to a shaft and a side or end of a trough, means that oscillation of the shaft is in sufficient proximity or mechanical connection to one side or end of that trough, such that oscillations of the shaft have the effect of shaking the trough, such as by vibrations or other shaking motions. A "side" of a trough is a portion that extends longitudinally in the same direction as the trough's longest dimension, whereas an "end" is a portion found at a terminus of its longest dimension. A side or end can refer to either an interior or exterior surface of the trough.

The term "controller" has its usual and ordinary meaning in electronic controllers for motors. The term "capable of receiving input data" as used with respect to a controller means the ability to accept input values, settings or commands from a user. The term "capable of conveying values" as used with respect to input data received on a controller means that after receiving input data the controller is able to pass it on in the form of digital instructions to a motor.

The term "input data" and "input values" are synonymous and mean data and or settings entered by a user into a controller. The term "parameters" as used with respect to a motor controller means operating parameters for the controller, and particularly includes each of a shaft oscillation speed, arc angle, and net angle, but is not limited to those operating parameters. The term "other terms representing those parameters" means any other name(s) or phrasing that describes, commands, or otherwise includes the same respective performance specifications for the shaft as are discussed in this paragraph.

The terms "software" and "user interface" have their usual and ordinary meaning in the computer arts. The term "receiving" as used with respect to a motor controller that receives input values means that it enters them into a digital data system for operating that controller. The term "accepting" as used with respect to a user interface that accepts input values means that it enters them into a digital data system for operating a motor controller.

The term "unit load" refers to an individual item that is being transferred on the conveyor. It may be any suitable unit load for a conveyor, such as a pill, chip, part, fully or partially assembled device, food item or the like. A unit load may be transferred in isolation, or with many others but unstacked, or in a pile with many others that are being transferred at the same time. The term "simultaneously carried" as used with respect to an aggregate of unit loads on a conveyor means that the conveyor conveys them together.

The term "essentially horizontal" as used with respect to a trough means that the trough surface(s) upon which unit loads rest has or have a slope of no more than 5 degrees from level, i.e., the surface(s) is or are within ±5° of 0° on a trigonometric scale of ±360°.

The term "sloped downward" as used with respect to a transfer direction means that the trough surface(s) upon which unit loads rest is or are lower at the end toward which conveyed loads are being transferred.

The term "sloped upward" as used with respect to a transfer direction means that the trough surface(s) upon which unit loads rest is or are higher at the end toward which conveyed loads are being transferred.

The term "transfer direction" as used with respect to a conveyor means the direction in which unit loads that are placed on such a device are transported. The term "reversal of transfer direction" means that the transfer then occurs in the opposite direction.

The term "transfer rate" as used with respect to a conveyor means the speed with which unit loads that are placed on such a device are transported by the conveyor. The term "alteration of transfer rate" means that the rate of transport is accelerated or decelerated.

The term "requires no manual mechanical adjustment" as used with respect to alteration of parameters for transfers on a conveyor means that no temporary or fixed arrangement of parts in the device must be changed to achieve the alteration. For instance, an operational change that can be implemented solely by electronic programming is a non-limiting example of one that requires no manual mechanical adjustment. Another example is a change that is implemented by the mere sending of one or more remote signals, e.g., an adjustment that is mediated by transmissions of photons or phonons, without manual mechanical adjustment of the conveyor.

The term "adaptation" as used with respect to changes in mass or size of items placed on the trough means, any adjustments made to accommodate bigger, smaller, heavier, or lighter unit loads placed on the trough for transfer by the vibrating conveyor of the invention.

The terms "spring", "rotating weight", and "electromagnetic field" have their usual and ordinary respective meanings in the field of vibrating conveyors. The term "an oscillation mechanism that is being controlled by an electromagnetic field" means a mechanical component or mechanical module that is being made to move in an oscillating pattern by cycling of an electromagnetic field.

The terms "mass", "weight", and "volume" have their usual and ordinary respective meanings in physics and engineering.

The term "in mechanical communication with" means that items so affected by each other are configured to give and or receive the application of force from one another through a mechanical connection or mechanical contact. This may be a one-way mechanical communication or a two-way mechanical communication. The mechanical communication may be to any face of a trough of the invention, particularly to an outside face such as to a suspension means above, to a support means below, or to a side or end of the trough. The mechanical communication may be in the form of vibration or another mode of mechanical force.

The term "in electrical communication" means that items so affected by each other are configured to give and or receive electrical current and or digital instructions from one another through an electrical connection or electrical contact. This may be a one-way electrical communication or a two-way electrical communication. Electrical communications for purposes of the invention may concern any of oscillation speed, arc angle, and or net angle, particularly as delivered from a controller to a motor.

The term "processing device" means a device a device that physically processes alters a unit load that is transferred to or from it by a vibrating conveyor according to the invention. Nonlimiting illustrative examples of processing by such devices include crimping, stamping, drilling, folding, bending, heating, cooling, cutting, gluing, painting, bolting, and attaching. The term "the conveyor operates to transfer unit loads" means that the conveyor is in use to move unit loads from one location to another.

The term "vibration" has its usual and ordinary meaning in the mechanical arts, and particularly refers to periodic oscillations with respect to an equilibrium point. Vibrations are commonly observed for beams, strings, plates and membranes. A vibration may have a characteristic frequency that is a function of an oscillation's characteristic frequency.

The term "sort" when used as a verb with respect to sorting of unit loads according to their respective masses or volumes means that they are ordered thereby.

The term "separate" when used as a verb with respect to sorting of unit loads means that they are drawn apart from one another. Separation may be done without respect to mass or volume, or may be done in combination with sorting by unit mass and or volume.

The invention may be further understood by the following description.

The invention provides a trough to which motion is applied variably, cyclically and adaptably. A motor turns a shaft in an oscillating or rocking motion about its longitudinal axis. Variable settings on a controller determine the oscillation parameters for the motor. These particularly include three variable settings: the oscillation speed; the arc angle through which the oscillation proceeds; and the net angle. The net angle represents the mid-point for the oscillation; it can be understood as a two-dimensional plane emanating from the center of the shaft along the line that bisects the arc angle. The net angle is measured as the difference of the plane from vertical, and is the smallest angle that can be drawn between the vertical and a line in that plane.

In combination with the oscillation speed, the arc angle determines an oscillation's characteristic frequency and amplitude.

The shaft is used to suspend, support, or otherwise make mechanical contact with a trough. The net angle determines the direction along which unit loads proceed on a conveyor, which may be altered. Thus, unit loads may be transferred forward or backward along the conveyor, or orthogonally or diagonally on it depending on the direction of oscillation.

The motor may be any type of motor that is suitable for producing oscillations, such as a servo motor or step motor. Transfer of the force from the shaft to the trough may be delivered through one or more parts in its suspension, or through a support shaft that is underneath the trough, or through a mechanical contact at one or both sides of the trough or at one or both ends of it. The motion may be amplified, such as by use of a spindle on the shaft, wherein the spindle has a larger diameter that the shaft, and it is the spindle diameter or some intermediate diameter that determines the magnitude of the oscillation cycles of the trough.

In this design the rotational speed of the shaft conveys alternatingly upward or downward force on the trough in proportion to that speed. Each oscillation through the arc angle conveys lateral force along the trough in proportion to that angle. It is to be understood that the terms "upward" and "downward" here do not require strictly vertical force, and that the term "lateral" here does not require strictly horizontal force.

In combination with the oscillation speed, the arc angle determines the amplitude for force applied in each half of an oscillation cycle. And the oscillation speed, arc angle and net angle together determine transfer rates at which items of a particular size and mass that are placed on the conveyor can proceed along it.

Figure 1B:
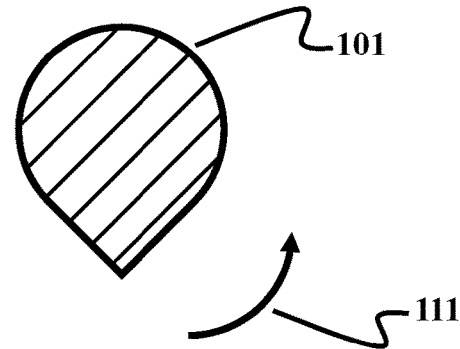
FIG. 1B is a caricature of a transverse tear-drop shaped cross-section of a shaft at its clockwise extreme of rotation.
Figure 1C:
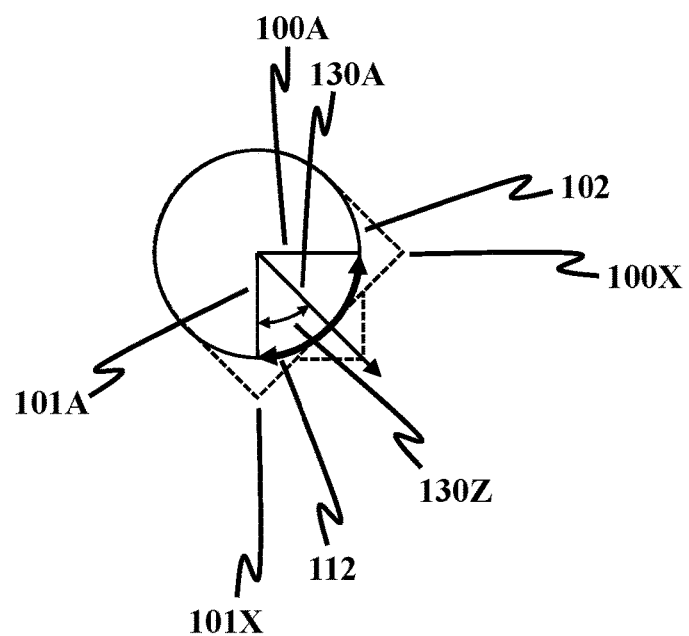
FIG. 1C is a caricature of a transverse tear-drop shaped cross-section of a shaft at its midpoint in rotation, together with the arc angle and net angle.

The invention and its scope have been successfully tested in operation. They may be further understood by consideration of the drawings provided herewith. For ease in illustrating features of the invention, FIGS. 1A, 1B and 1C depict caricatures of transverse cross-sections of a shaft according to the invention. For purposes of clarifying its orientation, in this embodiment the cross-section has a tear-drop shape. FIG. 1A shows a shaft 100 at the extreme of an oscillation arc that is counterclockwise as viewed on the page and is a first position in an oscillation. Oscillation arc 110 proceeds clockwise. FIG. 1B shows a shaft 101 at the extreme of an oscillation arc that is clockwise as viewed on the page, and a second oscillation position. Oscillation arc 111 proceeds counterclockwise. The rate at which the shaft turns for arcs 110 and 111 is the oscillation speed (not shown). FIG. 1C depicts a shaft 102. Its counterclockwise extreme position 100X and clockwise extreme position 101X define respective rays 100A and 101A that represent the limits for arc angle 112 through which the shaft is turned and oscillated. For purpose of illustration, 100A is chosen as horizontal and 101A is chosen as vertical, but the invention is not so limited. Bisection of that angle yields a ray 130A, representing the midpoint position for the oscillation. The angle between 130 and vertical—and here the vertical coincides with 101 A—is the net angle 130Z. Note that the net angle 130Z is half of the arc angle only because 101A falls at the vertical downward position. If 101A had another orientation the net angle 130Z would be different.

Figure 2:
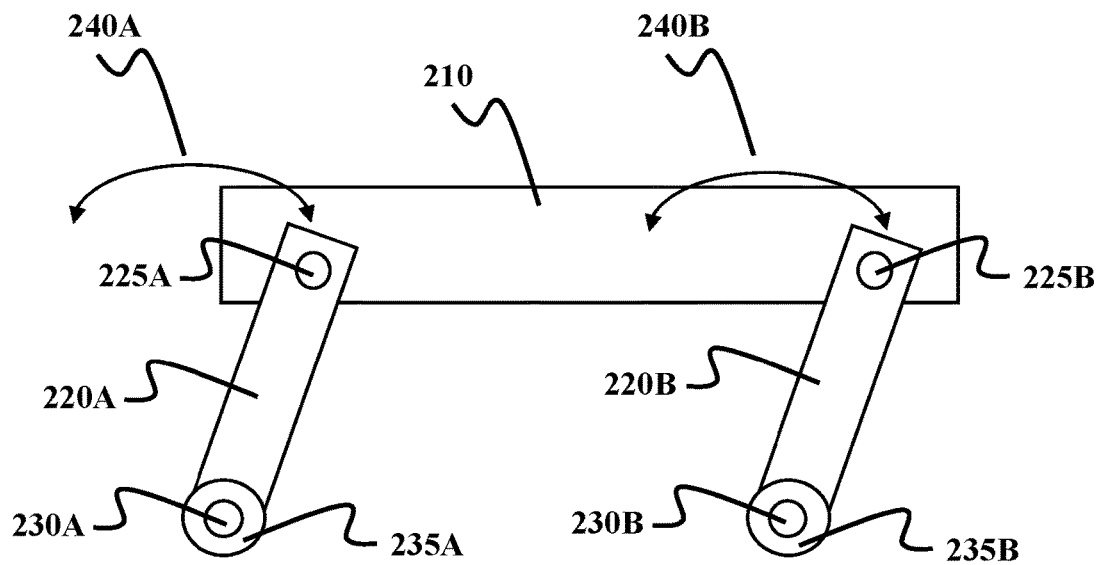
FIG. 2 is a caricature of a side view of a trough that is above and supported by a shaft in a conveyor according to the invention, as upheld by legs.

FIG. 2 is a caricature of a side view of the exterior of a trough 210 that is above and supported by legs 220A and 220B for which each leg has a respective end that is connected to the trough by connectors 225A or 225B, respectively, and for which each leg has a respective other end that is connected to shaft 230A or 230B, respectively. The shafts are shown end-on; they rotate within and support a conveyor according to the invention. The invention is not limited by the direction or angle by which legs lean, if they lean at all, nor is it limited by whether they all lean in the same direction if they lean at all, nor is it limited by the position of the legs relative to where they are connected to the trough or shafts. Connectors 225A and 225B are connected in a turn-able fashion, such as with bearings that permit and convey facile oscillations there. Also connectors 235A and 235B, respectively, may be connected pairwise to two respective shafts 230A and 230B that serve as axles. By pairwise is meant that one leg on one side and a corresponding leg (not shown) on the opposite side of the trough are both mounted to or otherwise in mechanical communication with the same shaft. Double arrows 240A and 240B show an illustrative range of motion and positions for the tops of the legs during oscillation and or vibration about the respective shaft that is connected at the bottom of each leg, but the invention is not limited by the range of motion depicted herein.

Figure 3:
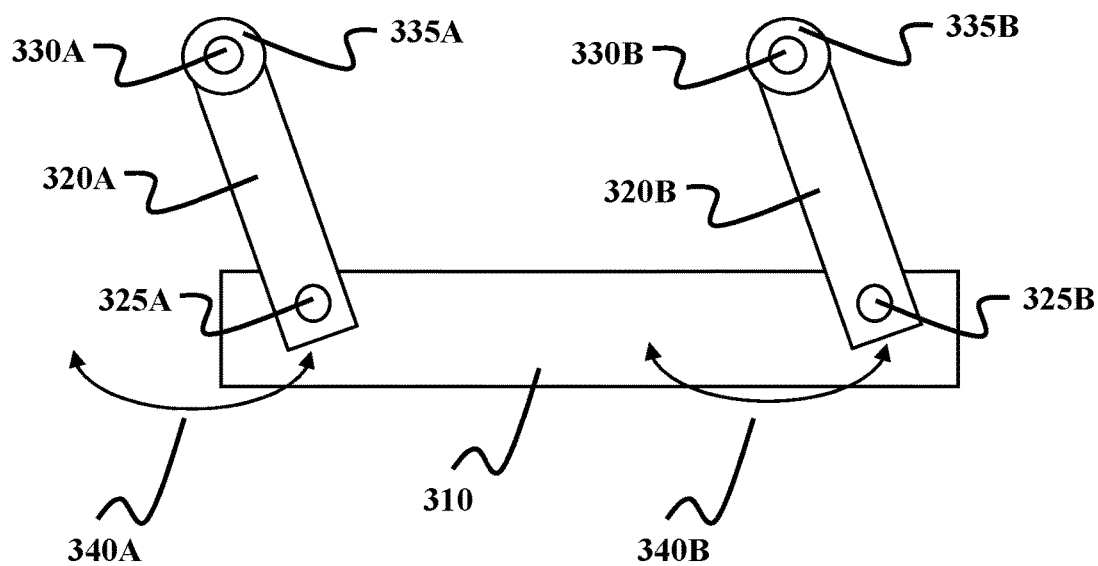
FIG. 3 is a caricature of a side view of a trough that is below and pendant from a shaft in a conveyor according to the invention, as suspended by legs.

FIG. 3 is a caricature of a side view of the exterior of a trough 310 that is below and pendant by means of legs 320A and 320B for which each leg has a respective end that is connected to the trough by connectors 325A or 325B, respectively, and for which each leg has a respective other end that is connected to shaft 330A or 330B, respectively. The shafts are shown end-on; they rotate within and support a conveyor according to the invention. The invention is not limited by the direction or angle by which legs lean, if they lean at all, nor is it limited by whether they all lean in the same direction if they lean at all, nor is it limited by the position of the legs relative to where they are connected to the trough or shafts. Connectors 325A and 325B are connected in a turn-able fashion, such as with bearings that permit and convey facile oscillations there. Also, connectors 335A and 335B, respectively, may be connected pairwise to two respective shafts 330A and 330B that serve as axles. By pairwise is meant that one leg on one side and a corresponding leg (not shown) on the opposite side of the trough are both mounted to or otherwise in mechanical communication with the same shaft. Double arrows 340A and 340B show an illustrative range of motion and positions for the lower ends of the legs during oscillation and or vibration about the respective shaft that is connected at the top of each leg, but the invention is not limited by the range of motion depicted herein.

The number of legs in the embodiment of the invention depicted in FIGS. 2 and 3 is two but the invention is not so limited. There may be any number of one or more legs or other supporting structural features that support the trough and communicate oscillating mechanical force to it. And there may be any number of one or more shafts to drive oscillations of the legs and or of other supporting structural features. Also, the number of motors required in FIGS. 2 and 3 is one, e.g., attached to either of shafts 235A or 235B or to either of shafts 335A or 335B: movement about the respective other shaft may optionally be passive, not driven. But the invention is not so limited. The invention as shown here has been found to work adequately when both of two shafts are driven by motors. Moreover, the invention is not contingent upon which one of multiple shafts is mechanically connected to and driven by the motor when only a single motor is employed. Also, the invention is not contingent upon whether the trough is supported from below, as by legs, or supported from above, as when it is connected to and hangs from one or more axles.

Figure 4:
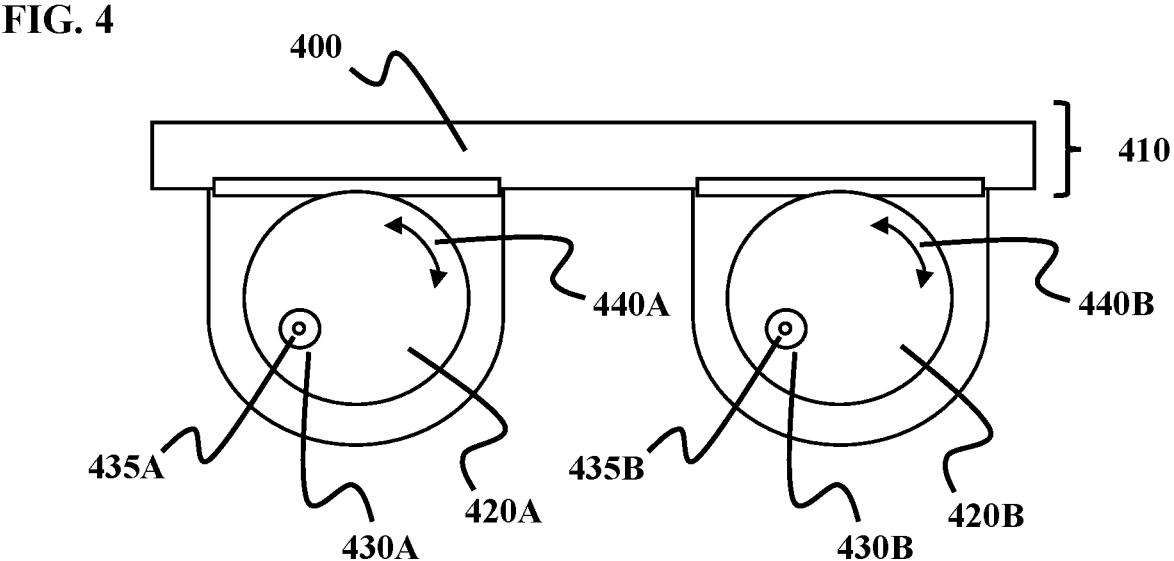
FIG. 4 is a caricature of a cross-section of a cross-sectional view of a force-conveying member that may be used in order to convey bump forces according to the invention.

FIG. 4 is a caricature of a cross-sectional view of a non-limiting illustrative embodiment of a force-conveying member that may be used in the orientation depicted or for instance upside down or perpendicular or at some other angle relative to the orientation depicted, in order to convey bump forces according to the invention, and may optionally be used to provide support for the trough. This force-conveying member comprises a frame 400 having a lengthwise portion 410. Within the frame are bearing modules 420A and 420B comprising raceways (not shown). Respective shafts 430A and 430B are shown in cross section, where the position of the longitudinal axis running through each is 435A and 435B, respectively. Shafts 430A and 430B are provided and operated according to the invention, and here are located off-center relative to their respective bearing modules, where they impart an illustrative range of motion represented by double arrows 440A and 440B, respectively. The inventor has found that this particular design is effective for purposes of the invention. The force-conveying may be mechanically connected to the trough directly, or may be connected to a leg, plate, cable or other physical component that is mechanically connected to the trough.

Figure 5:
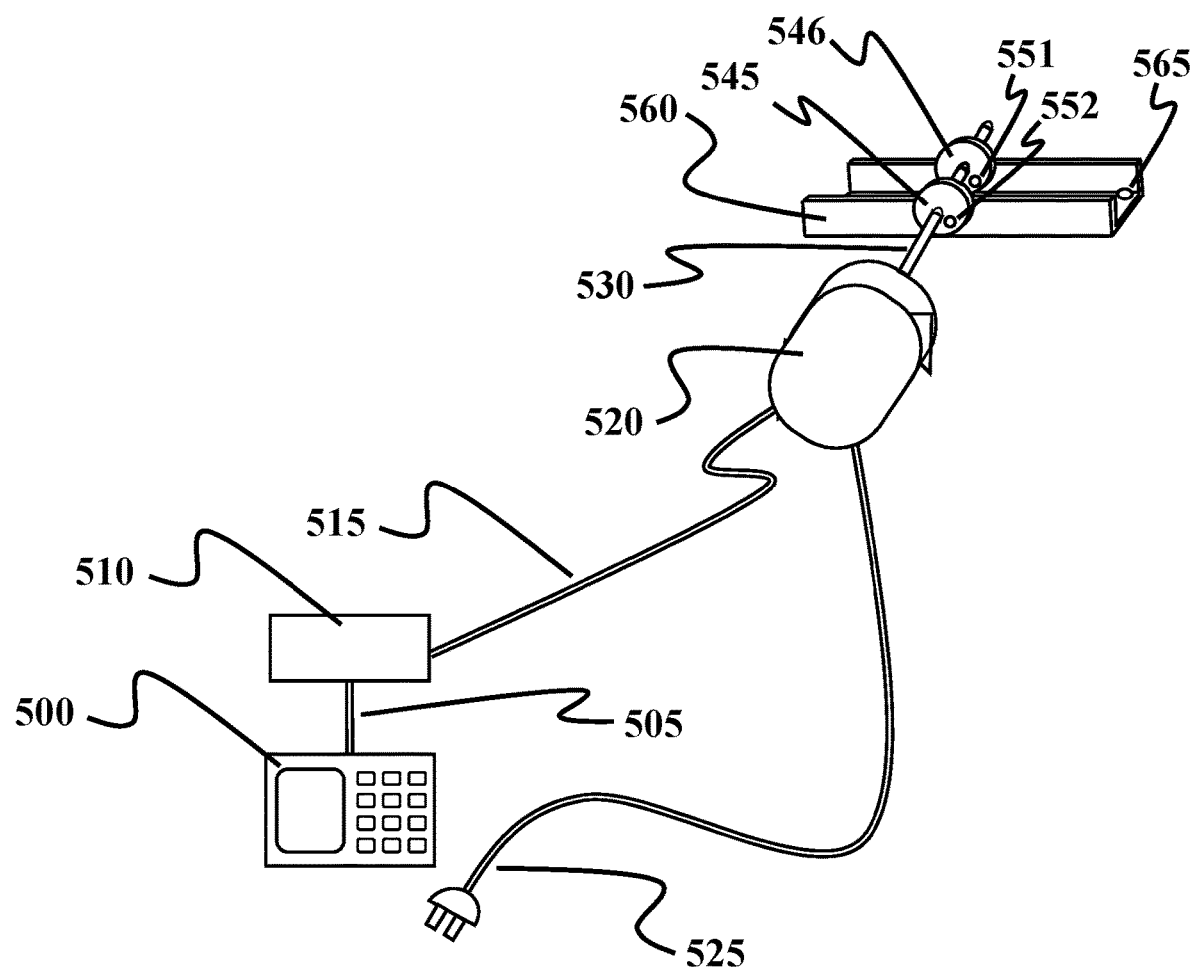
FIG. 5 provides a caricature of a portion of a working embodiment of the invention, including a motor, shaft, and trough.

FIG. 5 provides a drawing of an illustrative embodiment of a motor, shaft and trough employed for the invention. A user interface 500 for data inputs and collection is in electrical communication with a controller 510 by means of a first conduit 505. The controller 510 itself is in electrical communication with a servo motor 520 by means of a second conduit 515. Independently of each other the first and second conduits may be selected from cords, cables, hard-wired transmission lines or any other electrical conduit. A power cable 525 supplies electricity to drive the motor, however the power may optionally be supplied to the motor by transmissions through the controller and optionally user interface. The motor 520 is mechanically connected to a shaft 530 and oscillates that shaft about its longitudinal axis. Affixed on the shaft are disks 545 and 546. Those disks are rotatably attached to raised sides of a trough 560 by means of fittings 551 and 552, respectively. Thus, the trough is pendant from the shaft by means of the disks, however the trough may optionally have additional support from other sources. But also, rotatability of or within the fittings 551 and 552 allows the trough to remain horizontal or at some other preferred angle while the disks are turned in an oscillating fashion. This caricature depicts a unit load 565 that is being transferred by the vibrating conveyor of the invention. The trough sends unit loads in either direction depending on a net angle that is determined by input(s) at the user interface. The oscillation speed of the shaft and the arc angle through which the shaft is oscillated determine an upward "bump" force and the rate of transfer. Increasing the magnitude of those variables and or of the net angle increases the transfer rate.

The embodiments of the invention as described herein are merely illustrative and are not intended to be exclusive. Numerous additions, variations, derivatives, permutations, equivalents, combinations and modifications of the above-described invention will be apparent to persons of ordinary skill in the relevant arts and are within the scope and spirit of the invention. The invention as described herein contemplates the use of those alternative embodiments without limitation.

I claim:

1. A digitally adjustable and reversible vibrating conveyor comprising:
   a) a shaft having a longitudinal axis;
   b) a motor that is mechanically connected to the shaft, and which turns the shaft about its longitudinal axis in an oscillating motion, wherein each oscillation occurs in a cycle that comprises:
      i) procession from a first oscillation position to a second oscillation position;
      ii) reversal of a spin direction;
      iii) procession back to the first oscillation position; and
      iv) reversal of the spin direction again;
   c) a controller that is in electrical communication with the motor, wherein the controller is capable of receiving input data from a user and conveys to the motor values that it receives for each of:
      i) an oscillation speed for a shaft about its longitudinal axis between a first oscillation position and a second oscillation position, wherein oscillating from the first position to the second position and then back to the first position defines an oscillation cycle;
      ii) an arc angle representing a difference between the first and second oscillation positions, wherein:
         A) bisection of the arc angle defines an oscillation midpoint position; and
         B) a midpoint plane is defined proceeding radially from the longitudinal axes of the shaft through a surface of the shaft along that bisection;
      iii) a net angle representing a difference between a vertical line and the midpoint plane; and
   d) a trough that is in mechanical communication with the shaft, such that:
      i) the oscillation speed of the shaft conveys cyclically alternating upward and downward force on the trough in proportion to that speed;
      ii) each oscillation through the arc angle conveys lateral force along the trough for a period that is proportional to that angle, wherein:
         A) in combination with the oscillation speed the arc angle determines an oscillation's characteristic frequency; and
         B) in combination with the oscillation speed the arc angle also determines amplitude for the force applied in each half of an oscillation cycle;
      iii) whether the net angle is positive or negative determines whether items placed on the conveyor proceed in a net forward direction or net backward direction along the trough or remain in place there; and
      iv) the oscillation speed, arc angle and net angle together determine transfer rates at which items of a particular size and mass that are placed on the conveyor can proceed along the trough.

2. The vibrating conveyor of claim 1, wherein the motor is a servo motor or a stepper motor.

3. The vibrating conveyor of claim 1, wherein the shaft has a transverse cross-sectional shape selected from the group consisting of round, oval, tear-drop-shaped, square, three-sided, five-sided, six-sided, seven-sided, eight-sided, and a polygonal shape having more than eight sides.

4. The vibrating conveyor of claim 1, wherein the shaft is characterized by a gear-shaped transverse cross-section.

5. The vibrating conveyor of claim 1, wherein the trough is pendant from the shaft.

6. The vibrating conveyor of claim 1 wherein the shaft is below and physically supporting the trough.

7. The vibrating conveyor of claim 1 wherein the shaft is in mechanical communication with a side of the trough.

8. The vibrating conveyor of claim 1 wherein the shaft is in mechanical communication with an end of the trough.

9. The vibrating conveyor of claim 1 wherein the controller receives input data by means of software that has a user interface.

10. The vibrating conveyor of claim 1, wherein the controller is provided with a user interface that accepts input values for each of oscillation speed, arc angle, and net angle, or for other terms representing those parameters.

11. The vibrating conveyor of claim 1, wherein alteration of transfer rate requires no manual mechanical adjustment.

12. The vibrating conveyor of claim 1, wherein reversal of transfer direction requires no manual mechanical adjustment.

13. The vibrating conveyor of claim 1, wherein adaptation to changes in mass or size of items that are placed on the trough requires no manual mechanical adjustment.

14. The vibrating conveyor of claim 1, wherein the trough is essentially horizontal.

15. The vibrating conveyor of claim 1, wherein the trough is sloped downward in the transfer direction.

16. The vibrating conveyor of claim 1, wherein the trough is sloped upward in the transfer direction.

17. The vibrating conveyor of claim 1, wherein the transfer rates at which items of a particular size and mass can proceed along the trough is determined solely by the oscillation speed, arc angle and net angle together.

18. The vibrating conveyor of claim 1, wherein the conveyor operates to transfer unit loads from one processing device to another.

19. The vibrating conveyor of claim 1, wherein vibration of the conveyor is used to sort and separate unit loads according to their respective masses, wherein simultaneously carried unit loads vary in their respective masses.

20. The vibrating conveyor of claim 1, wherein vibration of the conveyor is used to sort and separate unit loads according to their respective volumes, wherein simultaneously carried unit loads vary in their respective volumes.

\* \* \* \* \*